(12) United States Patent
Chin

(10) Patent No.: US 9,188,795 B1
(45) Date of Patent: Nov. 17, 2015

(54) EYEGLASSES AND TEMPLE THEREOF

(71) Applicant: ASWAN INTERNATIONAL CORP., Taipei (TW)

(72) Inventor: Meng-Hsien Chin, Taipei (TW)

(73) Assignee: ASWAN INTERNATIONAL CORP., Taipei (TW)

( * ) Notice: Subject to any disclaimer, the term of this patent is extended or adjusted under 35 U.S.C. 154(b) by 0 days.

(21) Appl. No.: 14/468,450

(22) Filed: Aug. 26, 2014

(51) Int. Cl.
*G02C 5/14* (2006.01)
*G02C 5/16* (2006.01)

(52) U.S. Cl.
CPC ....................................... *G02C 5/16* (2013.01)

(58) Field of Classification Search
CPC ......... G02C 5/143; G02C 5/16; G02C 5/2209
USPC ........ 351/123, 111, 158; 2/12; D16/315, 335, D16/338
See application file for complete search history.

(56) References Cited

U.S. PATENT DOCUMENTS

| | | | | |
|---|---|---|---|---|
| 5,631,718 | A * | 5/1997 | Markovitz | G02C 3/003 351/111 |
| 5,933,862 | A * | 8/1999 | Landis | A61F 9/045 2/12 |
| 6,745,396 | B1 * | 6/2004 | Landis | A61F 9/045 16/228 |
| D670,754 | S * | 11/2012 | Kuo | D16/315 |
| 2014/0078463 | A1 * | 3/2014 | Tsai | G02C 5/143 351/123 |

* cited by examiner

*Primary Examiner* — Hung Dang
(74) *Attorney, Agent, or Firm* — Li&Cai Intellectual Property (USA) Office

(57) ABSTRACT

A pair of eyeglasses comprises a frame, a lens unit fixed in the frame, and two temples pivotally connected to the frame. Each temple includes a pivoting arm pivotally connected to the frame and a flexible clipping arm integrally formed on the pivoting arm. The pivoting arm has a thru-hole. The clipping arm has a positioning pillar, a fixing portion integrally extended from one end of the positioning pillar, and an adjusting pad integrally extended from another end of the positioning pillar. The positioning pillar couples the thru-hole of the pivoting arm, the fixing portion is fixed on the outer surface of the pivoting arm, and the adjusting pad is arranged proximate to the inner surface of the pivoting arm. The adjusting pad is twistable with respect to the pivoting arm inside 60 degrees.

10 Claims, 8 Drawing Sheets

EYEGLASSES AND TEMPLE THEREOF

BACKGROUND OF THE INVENTION

1. Field of the Invention

The instant disclosure relates to a pair of eyeglasses; in particular, to a pair of eyeglasses and a temple thereof.

2. Description of Related Art

A pair of conventional eyeglasses includes a lens unit and two temples respectively installed on two opposite sides of the lens unit. Each temple has a pivoting portion pivotally connected to the lens unit and a wearing portion opposite to the pivoting portion. However, when the user wears the pair of conventional eyeglasses, the pair of conventional eyeglasses is easily separated from the user due to the movement of the user (e.g., jogging).

To achieve the abovementioned improvement, the inventors strive via industrial experience and academic research to present the instant disclosure, which can provide additional improvement as mentioned above.

SUMMARY OF THE INVENTION

One embodiment of the instant disclosure provides a pair of eyeglasses and a temple thereof for solving the problem of easily separating from the user, which is prevalent among conventional eyeglasses.

The pair of eyeglasses of the instant disclosure comprises: a frame having two pivoting portions respectively arranged on two opposite sides thereof; a lens unit fixed in the frame; and two temples respectively and pivotally connected to the two pivoting portions, wherein the two temples are pivotable between a folded position and an unfolded position with respect to the frame, and wherein each temple comprises: a pivoting arm having an inner surface and an outer surface, wherein one end of the pivoting arm is pivotally connected to the respective pivoting portion, another end of the pivoting arm has a thru-hole; and a flexible clipping arm integrally formed on the pivoting arm, wherein the clipping arm has a positioning pillar, a fixing portion integrally extended from one end of the positioning pillar, and an adjusting pad integrally extended from another end of the positioning pillar, wherein the positioning pillar is coupled to the thru-hole of the pivoting arm, the fixing portion is fixed on the outer surface of the pivoting arm, and the adjusting pad is arranged proximate to the inner surface of the pivoting arm, and wherein the adjusting pad is twistable with respect to the pivoting arm by taking the positioning pillar to be a fulcrum, and the twisting angle of the adjusting pad with respect to the pivoting arm is smaller than 60 degrees.

The temple of the pair of eyeglasses of the instant disclosure comprises: a pivoting arm having an inner surface and an outer surface, wherein one end of the pivoting has a thru-hole; and a flexible clipping arm integrally formed on the pivoting arm, wherein the clipping arm has a positioning pillar, a fixing portion integrally extended from one end of the positioning pillar, and an adjusting pad integrally extended from another end of the positioning pillar, wherein the positioning pillar is coupled to the thru-hole of the pivoting arm, the fixing portion is fixed on the outer surface of the pivoting arm, and the adjusting pad is arranged proximate to the inner surface of the pivoting arm, and wherein the adjusting pad is twistable with respect to the pivoting arm by taking the positioning pillar to be a fulcrum.

In summary, the pair of eyeglasses of the instant disclosure is provided with the flexible clipping arm integrally formed on the end portion of the pivoting arm having the thru-hole, such that the connection between the pivoting arm and the clipping arm is non-detachable. Moreover, the twistable clipping arm is provided to avoid separation between the user and the pair of eyeglasses.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Please refer to FIGS. 1 through 8, which show an embodiment of the instant disclosure. References are hereunder made to the detailed descriptions and appended drawings in connection with the instant disclosure. However, the appended drawings are merely shown for exemplary purposes, rather than being used to restrict the scope of the instant disclosure.

Figure 1:
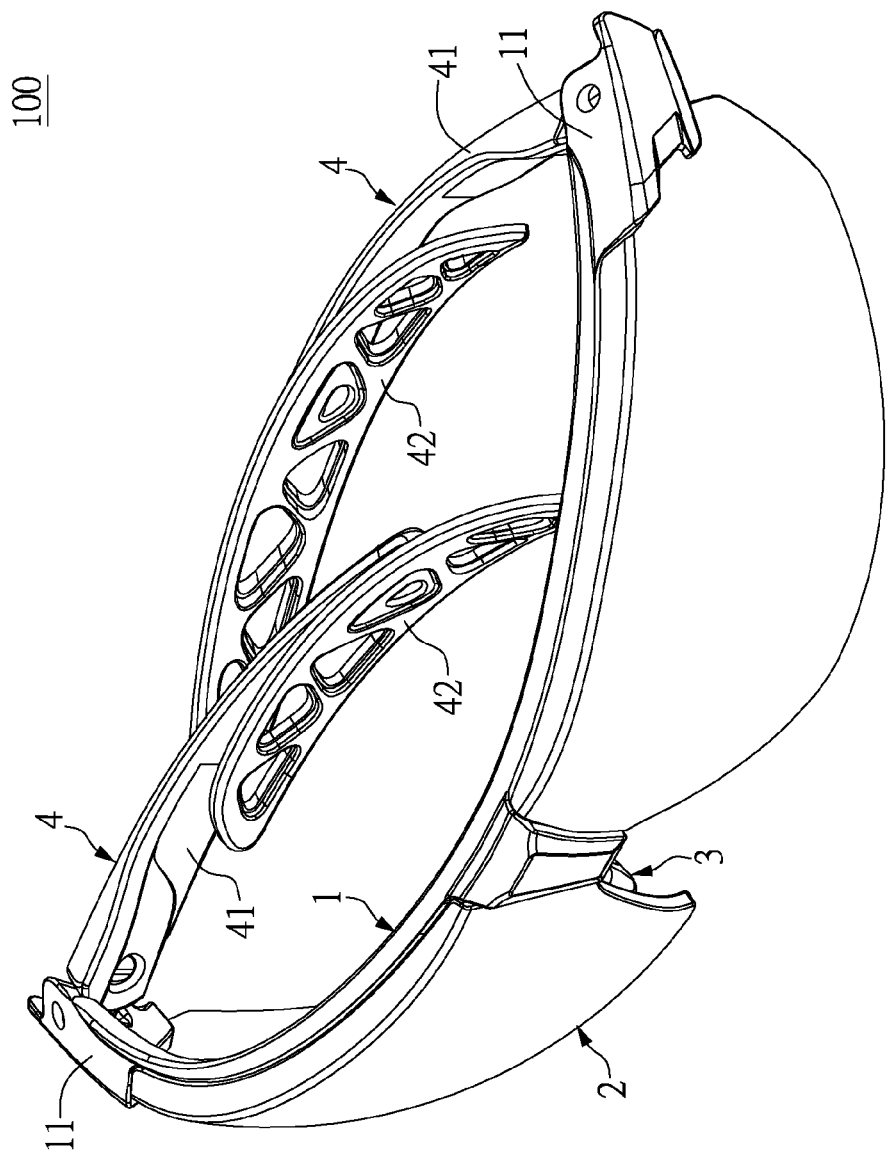
FIG. 1 is a perspective view showing a pair of eyeglasses at a folded position according to the instant disclosure.
Figure 2:
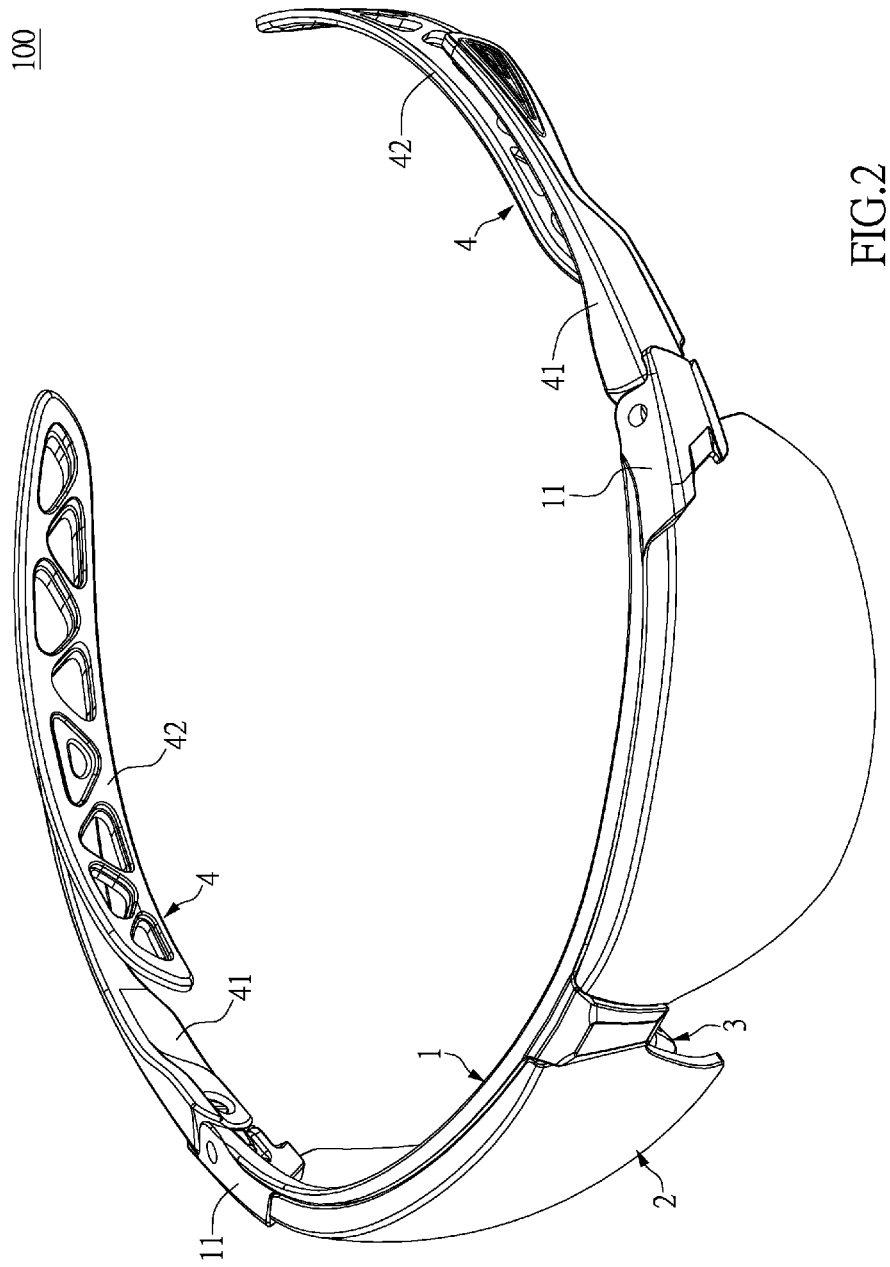
FIG. 2 is a perspective view showing the pair of eyeglasses at an unfolded position according to the instant disclosure.

As shown in FIGS. 1 and 2, the instant embodiment provides a pair of eyeglasses 100, which can be corrective glasses (e.g., (myopia, hyperopia, strabismus, astigmatism), sunglasses, goggles, decorative glasses, 3D glasses, or other types of glasses, but the pair of eyeglasses 100 is not limited thereto.

Figure 3:
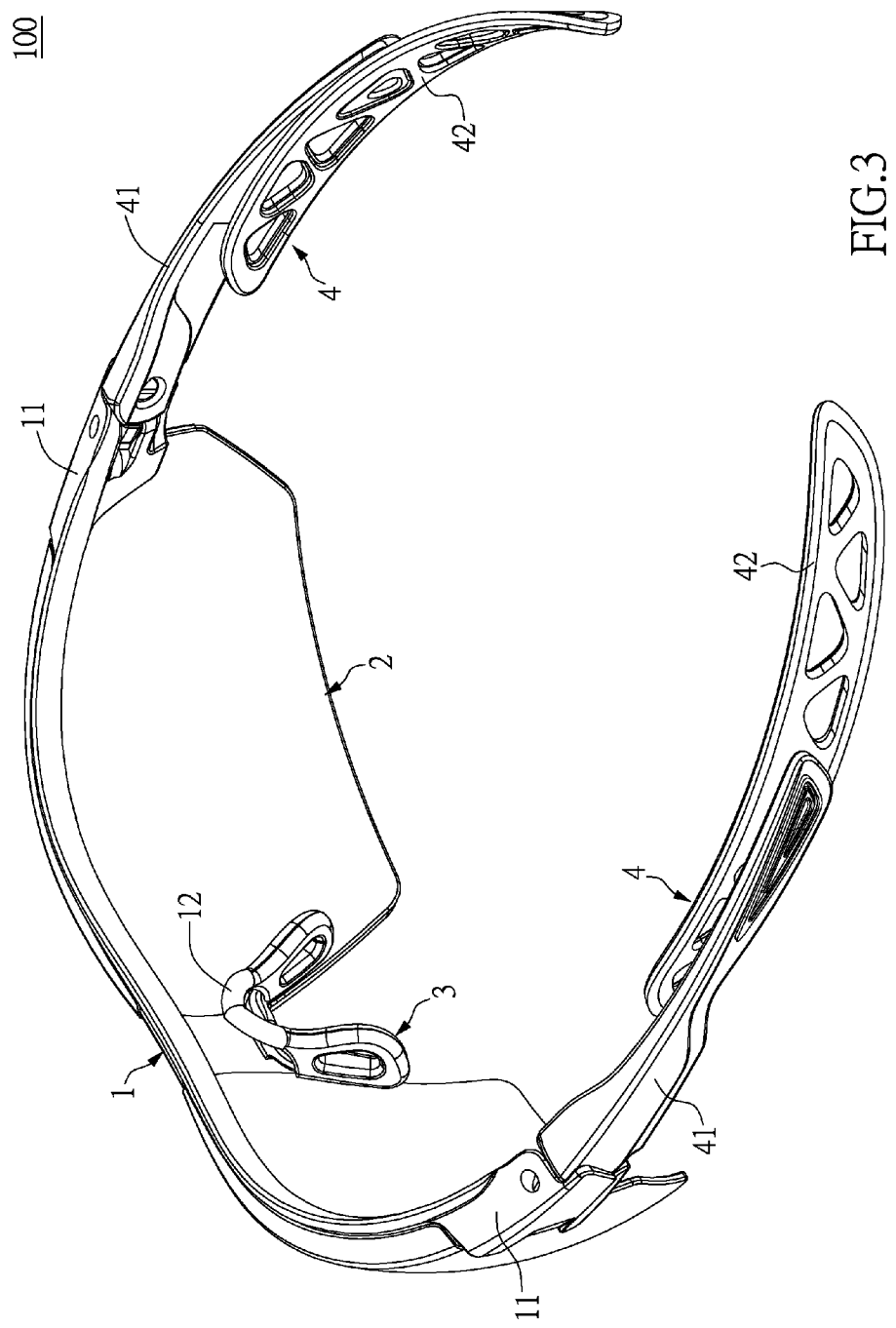
FIG. 3 is a perspective view showing the pair of eyeglasses of the FIG. 2 from another perspective.

The pair of eyeglasses 100 includes a frame 1, a lens unit 2 wedged in the frame 1, a nose pad 3 sleeved at the frame 1, and two temples 4 pivotally connected to the frame 1. The temples 4 are pivotable between a folded position (as shown in FIG. 1) and an unfolded position (as shown in FIG. 2 or 3) with respect to the frame 1. In order to easily realize the instant embodiment, the following description discloses each component of the pair of eyeglasses 100 based on the unfolded position as shown in FIG. 2 or 3.

The frame 1 in the instant embodiment is integrally formed as one body. The frame 1 has two pivoting portions 11 and a nose seat portion 12. The two pivoting portions 11 are respectively arranged on two opposite end portions of the frame 1 (i.e., the left end portion and the right end portion of the frame 1 as shown in FIG. 3), and the nose seat portion 12 is arranged on the center portion of the frame 1. Moreover, the lens unit 2 can be changed according to the designer's request (e.g. corrective glasses, sunglasses, goggles, decorative glasses, 3D glasses). The lens unit 2 can be a single lens or two separating lenses. The lens unit 2 is fixed on the frame 1 and is arranged between the pivoting portions 11, and the nose pad 3 sleeves the nose seat portion 12 of the frame 1.

The frame 1, the lens unit 2, and the nose pad 3 as disclosed in the above description can be changed according to the designer's request. For example, the frame 1 of the instant disclosure can be the frame of a pair of rimless glasses, or the frame 1 and the nose pad 3 are integrally formed as one body (i.e., rubber frame). The two temples 4 are respectively and pivotally connected to the two pivoting portions 11 of the frame 1. The temples 4 are substantially identical, so the following description only discloses one temple 4.

Figure 4:
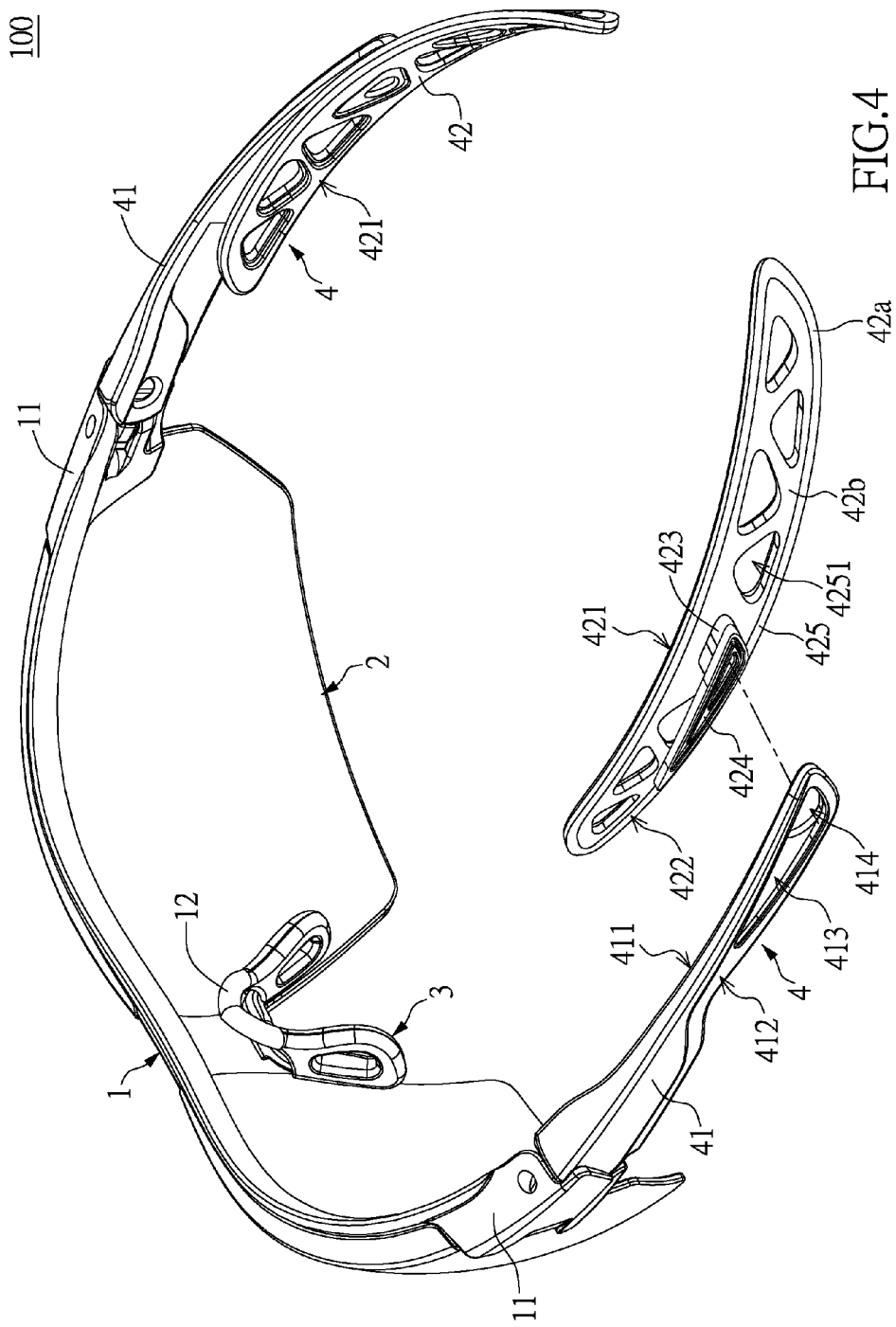
FIG. 4 is an exploded view showing the pair of eyeglasses of the FIG. 3.
Figure 5:
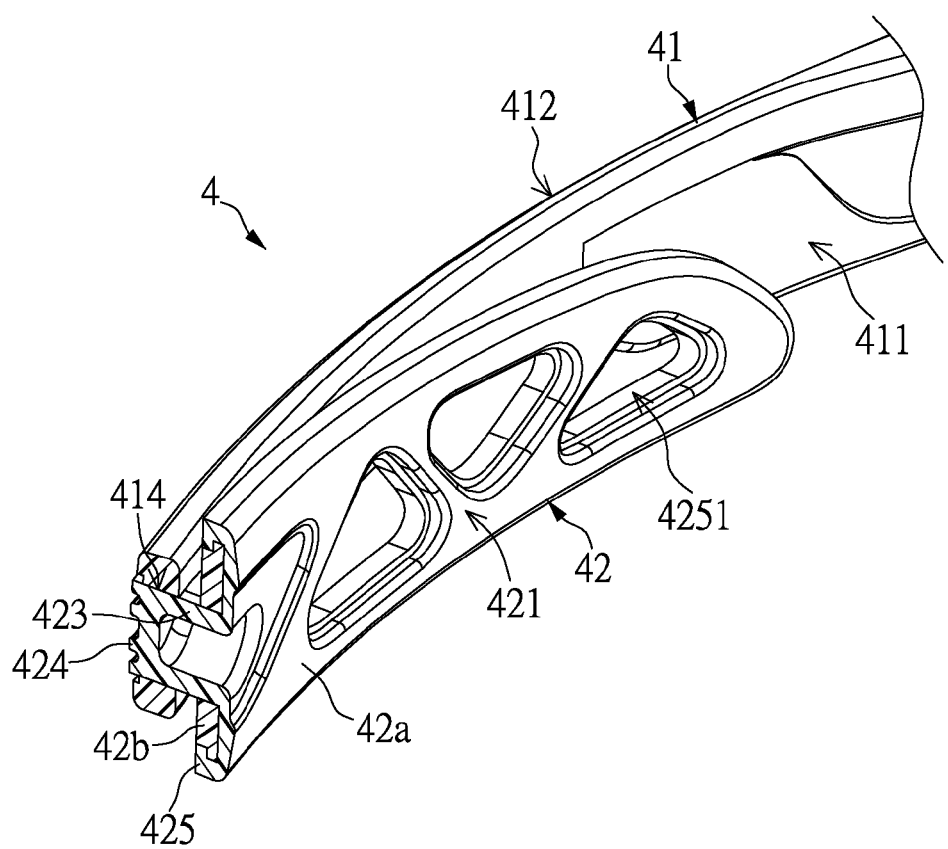
FIG. 5 is a cross-sectional view showing one temple of the pair of eyeglasses of the FIG. 3.
Figure 6:
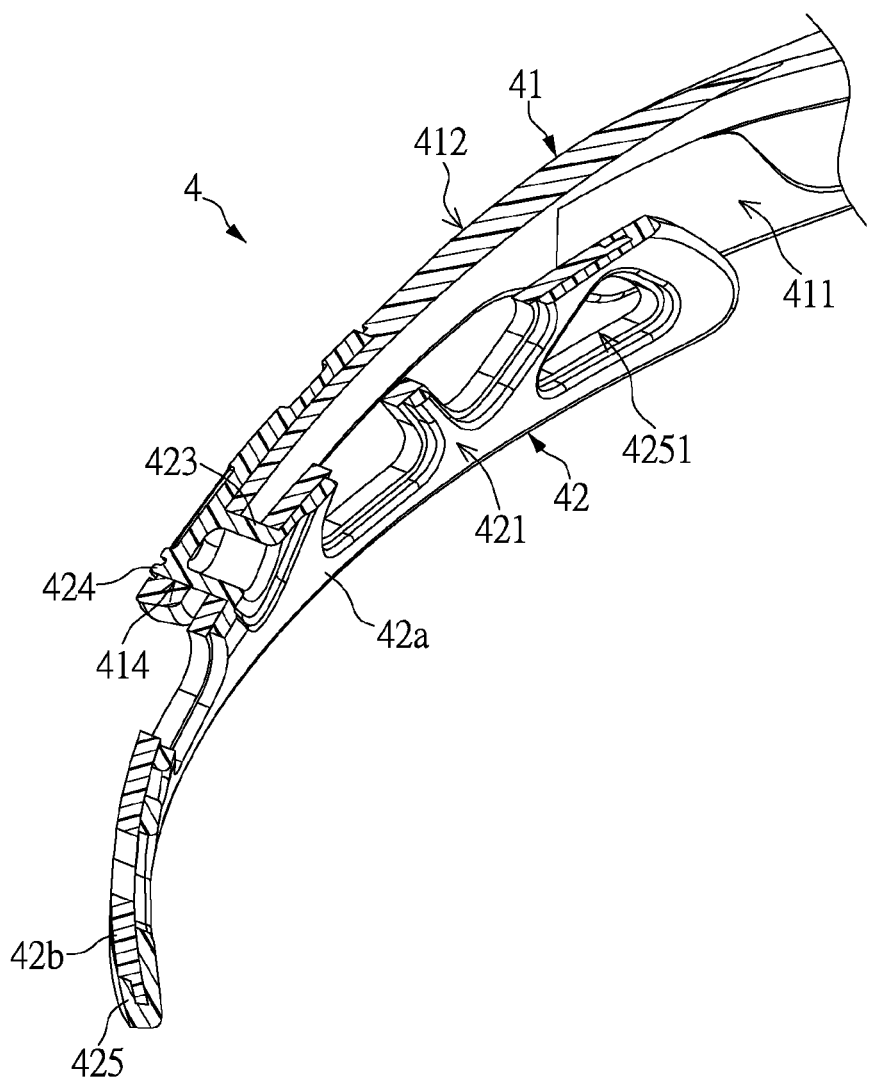
FIG. 6 is a cross-sectional view showing one temple of the pair of eyeglasses of the FIG. 3 from another cross-sectional plane.

Please refer to FIGS. 4 through 6. The temple 4 has an elongated pivoting arm 41 and an elongated clipping arm 42 integrally formed on the pivoting arm 41. The pivoting arm 41 and the clipping arm 42 in the instant embodiment are formed by double injection or insert molding. In other words, "the clipping arm 42 integrally formed on the pivoting arm 41" means that the clipping arm 42 is non-detachable from the pivoting arm 41.

On the other hand, if the clipping arm 42 and the pivoting arm 41 of the temple 4 are detachable with each other, that is different from the temple 4 as disclosed in the instant embodiment. The flexible clipping arm 42 is integrally formed on the end portion of the pivoting arm 41 having the thru-hole 414, such that the connection between the pivoting arm 41 and the clipping arm 42 is non-detachable.

The pivoting arm 41 has an inner surface 411 and an outer surface 412. One end portion of the pivoting arm 41 (i.e., the left portion of the pivoting arm 41 as shown in FIG. 4) is pivotally connected to the respective pivoting portion 11. Another end portion of the pivoting arm 41 (i.e., the right portion of the pivoting arm 41 as shown in FIG. 4) has a fixing trough 413 concavely formed on the outer surface 412, and a thru-hole 414 in fluid communication with the fixing trough 413. The thru-hole 414 passes from the bottom of the fixing trough 413 to the inner surface 411. That is to say, the cross-section of the fixing trough 413 is larger than the cross-section of the thru-hole 414.

The clipping arm 42 is a flexible structure. The "flexible structure" in the instant embodiment means that deformation or bending of the flexible construction caused by an external force (e.g., the user wears the pair of eyeglasses 100) returns to the original shape as the external force is dissipated (e.g., the user takes off the pair of eyeglasses 100).

The clipping arm 42 in the instant embodiment is made of a soft element 42a (e.g., silicone) and a rigid element 42b (e.g., resilient sheet) embedded in the soft element 42a. The soft element 42a of the clipping arm 42 is configured to contact the user for providing a comfortable feel to the user when the user wears the pair of eyeglasses 100. The rigid element 42a of the clipping arm 42 has resilience to provide better clipping force when the user wears the pair of eyeglasses 100, thereby preventing the pair of eyeglasses 100 from separating from the user and quickly returning the clipping arm 42 to the original shape as the user takes off the pair of eyeglasses 100.

Additionally, the clipping arm 42 in the instant embodiment is made of the soft element 42a covering the rigid element 42b for example, but is not limited thereto. The clipping arm 42 in another embodiment (not shown) can be formed by one element.

In order to disclose the clipping arm 42 clearly, the following description regards the clipping arm 42 as one body. The clipping arm 42 has a positioning pillar 423, a fixing portion 424 integrally extended from one end of the positioning pillar 423 (i.e., the left end of the positioning pillar 423 as shown in FIG. 6), and an adjusting pad 425 integrally extended from another end of the positioning pillar 423 (i.e., the right end of the positioning pillar 423 as shown in FIG. 6). The positioning pillar 423 is connected to the center portion of the adjusting pad 425. Each one of the cross section of the fixing portion 424 and the cross section of the adjusting pad 425 is larger than the cross section of the positioning pillar 423.

The positioning pillar 423 couples the thru-hole 414 of the pivoting arm 41, and the positioning pillar 423 is seamlessly connected to the wall of the pivoting arm 41 defining the thru-hole 414. The fixing portion 424 is fixed on the outer surface 412 of the pivoting arm 41. Specifically, the fixing portion 424 is seamlessly connected to the inner wall of the fixing trough 413 of the pivoting arm 41 to engage in the fixing trough 413. The adjusting pad 425 is arranged near to the inner surface 411 of the pivoting arm 41. The adjusting pad 425 is at least partially sticking out of the pivoting arm 41, that is to say, the length of the temple 4 is the sum of the length of the pivoting arm 41 and the length of a portion of the adjusting pad 425 sticking out of the pivoting arm 41.

Specifically, the adjusting pad 425 having an elongated shape includes an inner side surface 421 and an outer side surface 422. The inner side surface 421 is approximately arc-shaped and is arranged away from the inner surface 411 of the pivoting arm 41, and the outer side surface 422 is arranged proximate to the inner surface 411 of the pivoting arm 41. Moreover, the adjusting pad 425 has a plurality of penetrating holes 4251 arranged along the longitudinal direction thereof. The air permeability, the structural strength, and the resilient force of the adjusting pad 425 can be increased by forming the penetrating holes 4251.

When disclosing the clipping arm 42 as made of the soft element 42a and the rigid element 42b, the rigid element 42b belongs to part of the adjusting pad 425 (i.e., the portion of the adjusting pad 425 not contacting the user), and the soft element 42a includes the other part of the adjusting pad 425 (i.e., the portion of the adjusting pad 425 contacting the user), the positioning pillar 423, and the fixing portion 424. That is to say, the rigid element 42b is connected to the pivoting arm 41 by the soft element 42a.

Figure 7:
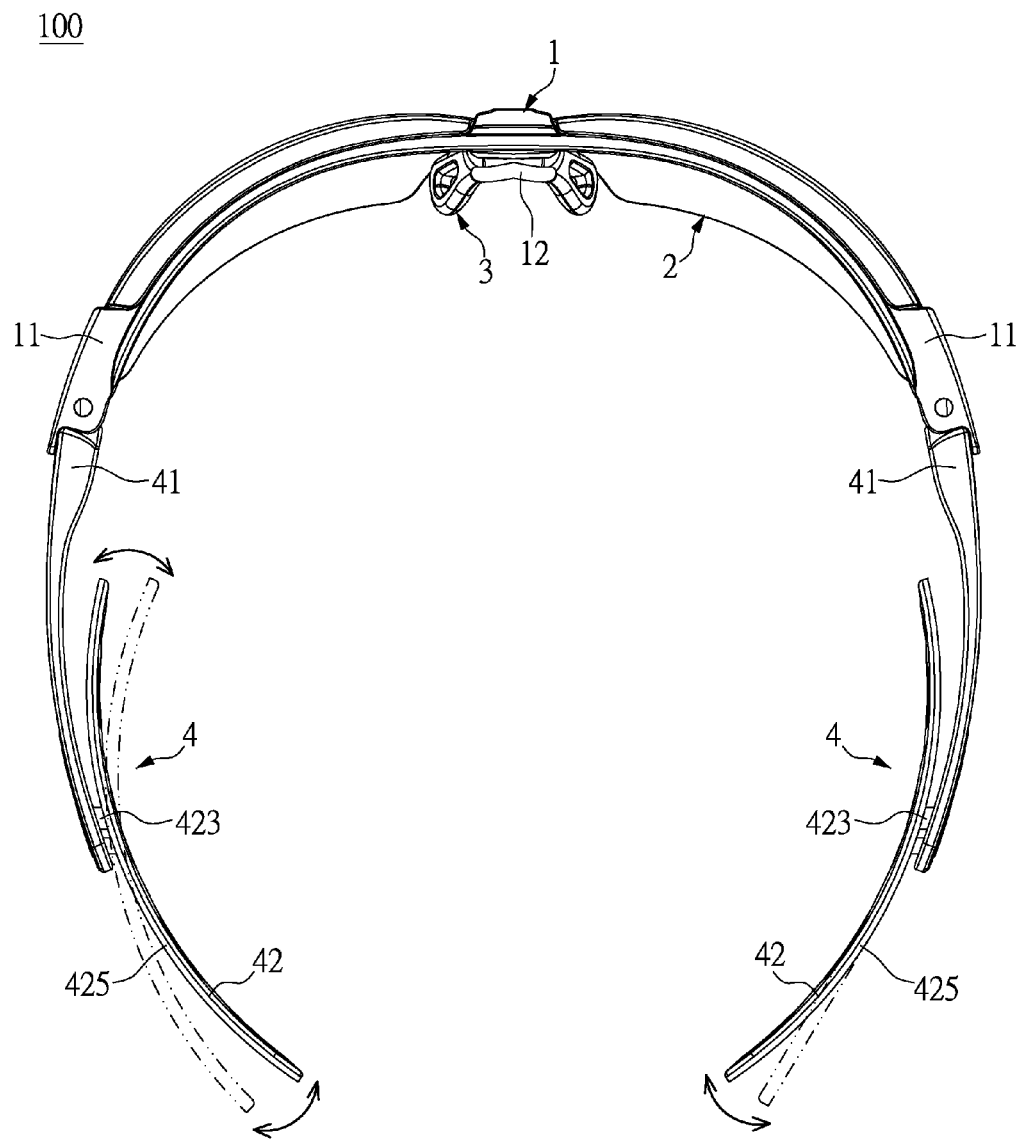
FIG. 7 is a perspective view showing a twisting range of the clipping arm of the pair of eyeglasses.
Figure 8:
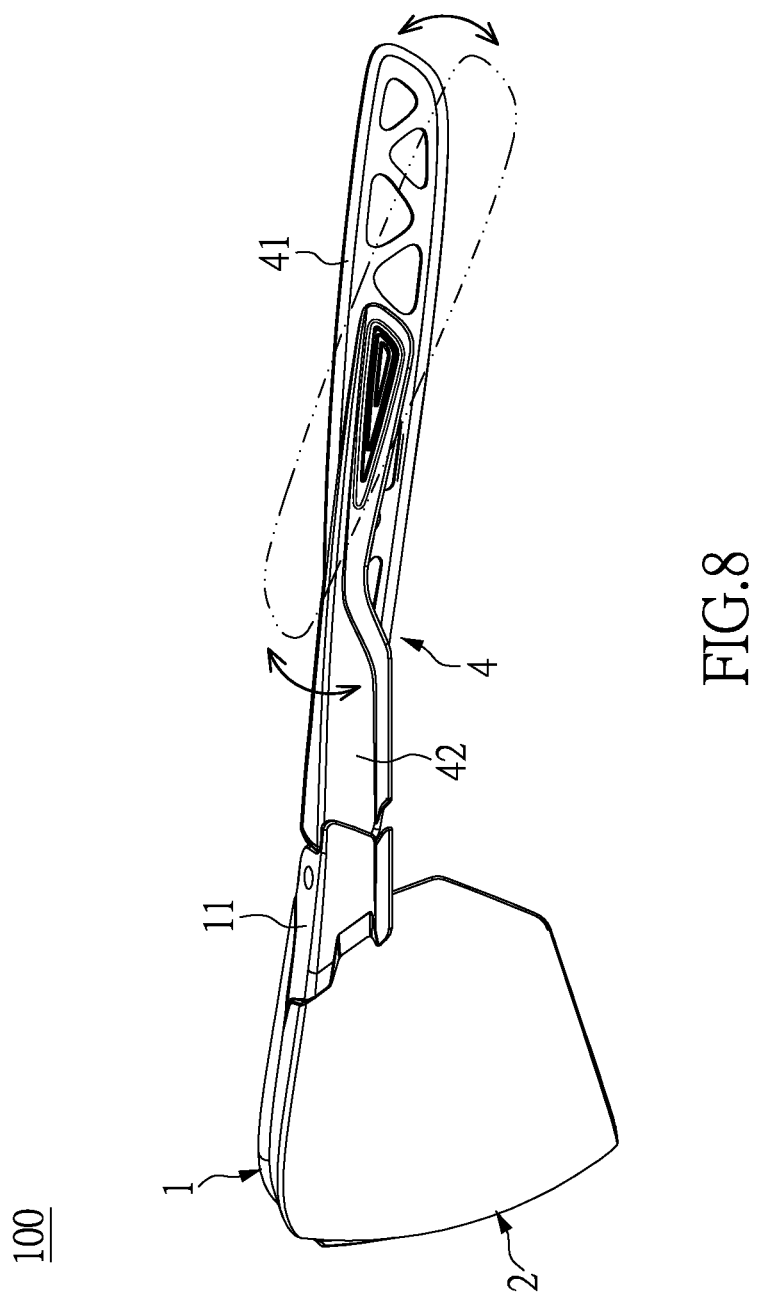
FIG. 8 is a perspective view showing another twisting range of the clipping arm of the pair of eyeglasses.

Additionally, in the instant embodiment, when the temples 4 are arranged at the unfolded position (as shown in FIG. 3 or FIG. 7), the end of each clipping arm 42 away from the frame 1 is approximately arranged in a region defined by the frame 1, the lens unit 2, the pivoting arms 41, and two virtual lines respectively extending from the pivoting arms 41.

The above description is the static features of the temple 4, and the following description discloses the dynamic features of the temple 4. Please refer to FIGS. 7 and 8. The adjusting pad 425 is twistable with respect to the pivoting arm 41 by taking the positioning pillar 423 to be a fulcrum, and a twisting angle of the adjusting pad 425 with respect to the pivoting arm 41 is smaller than 60 degrees. The upper limit of the twisting angle can be changed according to the designer's request. For example, the twisting angle of the adjusting pad 425 with respect to the pivoting arm 41 can be smaller than 45 degrees or 15 degrees.

Moreover, two opposite ends of the adjusting pad 425 away from the positioning pillar 423 are respectively twistable with respect to the pivoting arm 41 in different angles. For example, one end of the temple 4 (e.g., the bottom end of the right temple 4 in FIG. 7) is twisted with respect to the pivoting arm 41 in one angle, and another end of the temple 4 (e.g., the top end of the right temple 4 in FIG. 7) remains still (such as the twisting angle is zero). Thus, the pair of eyeglasses 100 is provided to avoid separating from the user by the twistable clipping arm 42.

The "twisting" in the instant embodiment is different from "pivoting", and the "twisting" in the instant embodiment means that the deformation of the clipping arm 42 caused by twisting is recovered. For example, the outer side surface 422 of the adjusting pad 425 and the inner surface 411 of the pivoting arm 41 has a gap arranged there-between, a portion of the positioning pillar 423 arranged in the gap is resilient when the adjusting pad 425 is twisted with respect to the pivoting arm 41.

[The Possible Effect of the Instant Disclosure]

In summary, the pair of eyeglasses of the instant disclosure is provided with the flexible clipping arm integrally formed on the end portion of the pivoting arm having the thru-hole, such that the connection between the pivoting arm and the clipping arm is non-detachable. Moreover, the pair of eyeglasses is provided to avoid separating from the user by the twistable clipping arm.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A pair of eyeglasses, comprising:
    a frame having two pivoting portions respectively arranged on two opposite sides thereof;
    a lens unit fixed in the frame; and
    two temples respectively and pivotally connected to the two pivoting portions, wherein the two temples are pivotable between a folded position and an unfolded position, and wherein each temple comprises:
        a pivoting arm having an inner surface and an outer surface, wherein one end of the pivoting arm is pivotally connected to the respective pivoting portion, and another end of the pivoting arm has a thru-hole; and
        a flexible clipping arm integrally formed on the pivoting arm, wherein the clipping arm has a positioning pillar, a fixing portion integrally extended from one end of the positioning pillar, and an adjusting pad integrally extended from another end of the positioning pillar, wherein the positioning pillar couples the thru-hole of the pivoting arm, the fixing portion is fixed on the outer surface of the pivoting arm, and the adjusting pad is arranged proximate to the inner surface of the pivoting arm, and the adjusting pad is twistable with respect to the pivoting arm by using the positioning pillar as a fulcrum, and the twisting angle of the adjusting pad with respect to the pivoting arm is smaller than 60 degrees.

2. The pair of eyeglasses as claimed in claim 1, wherein at each temple, the positioning pillar is seamlessly connected to a wall of the pivoting arm defining the thru-hole, the pivoting arm has a fixing trough concavely formed on the outer surface thereof, the fixing trough is in fluid communication with the thru-hole, and the fixing portion of the clipping arm is wedged in the fixing trough of the pivoting arm.

3. The pair of eyeglasses as claimed in claim 1, wherein at each temple, the adjusting pad has an elongated shape, the adjusting pad has an inner side surface and an outer side surface, the inner side surface is approximately arc-shaped and is arranged away from the inner surface of the pivoting arm, the outer side surface is arranged proximate to the inner surface of the pivoting arm, and the positioning pillar is connected to the center of the adjusting pad.

4. The pair of eyeglasses as claimed in claim 3, wherein at each temple, the adjusting pad is at least partially sticking out of the pivoting arm, the length of the temple is the sum of the length of the pivoting arm and the length of the portion of the adjusting pad sticking out of the pivoting arm.

5. The pair of eyeglasses as claimed in claim 3, wherein at each temple, the adjusting pad has a plurality of penetrating holes arranged thereon, two opposite ends of the adjusting pad away from the positioning pillar are twistable with respect to the pivoting arm at different respective angles.

6. A temple of a pair of eyeglasses, comprising:
    a pivoting arm having an inner surface and an outer surface, wherein one end of the pivoting has a thru-hole; and
    a flexible clipping arm integrally formed on the pivoting arm, wherein the clipping arm has a positioning pillar, a fixing portion integrally extended from one end of the positioning pillar, and an adjusting pad integrally extended from another end of the positioning pillar, wherein the positioning pillar couples the thru-hole of the pivoting arm, the fixing portion is fixed on the outer surface of the pivoting arm, and the adjusting pad is arranged proximate to the inner surface of the pivoting arm, and the adjusting pad is twistable with respect to the pivoting arm by using the positioning pillar as a fulcrum.

7. The temple as claimed in claim 6, wherein the positioning pillar is seamlessly connected to a wall of the pivoting arm defining the thru-hole, the pivoting arm has a fixing trough concavely formed on the outer surface thereof, the fixing trough is in fluid communication with the thru-hole, and the fixing portion of the clipping arm is wedged in the fixing trough of the pivoting arm.

8. The temple as claimed in claim 6, wherein the adjusting pad has an elongated shape, the adjusting pad has an inner side surface and an outer side surface, the inner side surface is approximately arc-shaped and is arranged away from the inner surface of the pivoting arm, the outer side surface is arranged proximate to the inner surface of the pivoting arm, the positioning pillar is connected to the center of the adjusting pad, and a twisting angle of the adjusting pad with respect to the pivoting arm is smaller than 45 degrees.

9. The temple as claimed in claim 8, wherein the adjusting pad is at least partially sticking out of the pivoting arm, the length of the temple is the sum of the length of the adjusting arm and the length of a portion of the adjusting pad sticking out of the pivoting arm.

10. The temple as claimed in claim 8, wherein the adjusting pad has a plurality of penetrating holes arranged thereon, two opposite ends of the adjusting pad away from the positioning pillar are twistable with respect to the pivoting arm at different respective angles.

* * * * *